(12) United States Patent
Yuan et al.

(10) Patent No.: US 11,764,650 B2
(45) Date of Patent: Sep. 19, 2023

(54) FEEDING APPARATUS AND NOISE REDUCTION MODULE AND METHOD THEREOF

(71) Applicant: CHICONY ELECTRONICS CO., LTD., New Taipei (TW)

(72) Inventors: Shang-Yuan Yuan, New Taipei (TW); Tung-Hsin Huang, New Taipei (TW)

(73) Assignee: CHICONY ELECTRONICS CO., LTD., New Taipei (TW)

( * ) Notice: Subject to any disclaimer, the term of this patent is extended or adjusted under 35 U.S.C. 154(b) by 488 days.

(21) Appl. No.: 17/142,719

(22) Filed: Jan. 6, 2021

(65) Prior Publication Data

US 2021/0288560 A1    Sep. 16, 2021

Related U.S. Application Data

(60) Provisional application No. 62/989,175, filed on Mar. 13, 2020.

(30) Foreign Application Priority Data

May 26, 2020   (TW) .................................. 109117551

(51) Int. Cl.
  *H02K 11/33*    (2016.01)
  *A01K 5/02*    (2006.01)
  *H02K 33/10*   (2006.01)
(52) U.S. Cl.
  CPC ................ *H02K 11/33* (2016.01); *A01K 5/02* (2013.01); *H02K 33/10* (2013.01)

(58) Field of Classification Search
  CPC .......... H02K 11/33; H02K 33/10; H02K 5/24; H02K 11/0094; A01K 5/02; G10L 21/0216; G10L 21/0232; G10L 2021/02163; H02P 8/00; H02P 29/00
  USPC .................................. 318/119, 126, 127, 128
  See application file for complete search history.

(56) References Cited

U.S. PATENT DOCUMENTS 6,259,224 B1 *   7/2001   Smith ................... G10K 11/178
                                                    318/128

* cited by examiner

*Primary Examiner* — David Luo
(74) *Attorney, Agent, or Firm* — MUNCY, GEISSLER, OLDS & LOWE, P.C.

(57) ABSTRACT

The present disclosure discloses a feeding apparatus, which includes a motor, a driving unit, and a noise reduction module. The noise reduction module includes an audio receiving unit and a control unit. The audio receiving unit receives the sound generated by the feeding apparatus when the motor is running. The control unit is electronically connected to the driving unit and the audio receiving unit. The control unit sequentially supplies a plurality of motor drive data to the driving unit to drive the motor to run. The control unit sequentially receives a plurality of sound signals corresponding to those motor drive data from the audio receiving unit. The control unit analyzes the sound signals and selects one of the sound signals as an optimized sound signal. The control unit stores the motor drive data corresponding to the optimized sound signal as a setting motor drive data.

15 Claims, 4 Drawing Sheets

FEEDING APPARATUS AND NOISE REDUCTION MODULE AND METHOD THEREOF

CROSS REFERENCE TO RELATED APPLICATIONS

This application claims priority of Application No. 109117551 filed in Taiwan on May 26, 2020 under 35 U.S.C. § 119; and this application claims priority of U.S. Provisional Application No. 62/989,175 filed on Mar. 13, 2020 under 35 U.S.C. § 119(e), the entire contents of all of which are hereby incorporated by reference.

BACKGROUND

1. Technical Field

The present disclosure relates to a feeding apparatus, in particular to a noise reduction module and a noise reduction method of the feeding apparatus.

2. Description of the Related Art

At present, more and more families or individuals raise pets, but the busy life makes it difficult for pet keepers to feed their pets regularly. In order to solve the problem of the pet keepers being unable to feed their pets when they are outside the home, an automatic feeding apparatus is available on the market. The pet keeper can put the pet foods directly into the feed storage chamber (material-containing chamber). This kind of feeding apparatus can provide one meal of feed at a predetermined time. In addition to the daily feeding of two or three meals, the pet keeper can interact with their pets by giving them pet food or snack to reward the pets. In this regard, another automatic feeding apparatus capable of flinging pet food toward a pet is commercially available, and this kind of feeding apparatus enhances the interaction between the pet and pet keeper.

This ejection type automatic feeding apparatus (i.e., feeding a pet by flinging food) has a complicated mechanism. For example, it requires an ejection rod to throw the pet food, and the ejection rod is usually driven by a motor. However, there is noise as the motor is operating, and the whole feeding apparatus will also produce vibration and noise as the mechanism is actuated. In addition to interfering with the pet keepers, these noises are more likely to affect the sharp hearing pets (such as common cats, dogs and other pets), which needs to be improved.

SUMMARY

In view of the aforesaid drawbacks of the prior art, it is an objective of the present disclosure to provide a feeding apparatus, a noise reduction module and a noise reduction method. The noise reduction module analyzes the sound generated by the feeding apparatus driven by different motor drive data, and stores the motor drive data corresponding to the optimized sound signal as a setting motor drive data to resolve the noise issue as the conventional feeding apparatus is operating.

In order to achieve the above object, the present disclosure provides a feeding apparatus, which comprises a motor, a driving unit, and a noise reduction module. The driving unit is electrically connected to the motor and drives the motor to run. The noise reduction module comprises an audio receiving unit and a control unit. The audio receiving unit receives the sound generated by the feeding apparatus as the motor is running. The control unit is electrically connected to the driving unit and the audio receiving unit. The control unit sequentially supplies a plurality of motor drive data to the driving unit to drive the motor to run. The control unit sequentially receives a plurality of sound signals corresponding to those motor drive data from the audio receiving unit. The control unit analyzes the sound signals and selects one of the sound signals as an optimized sound signal. The control unit stores the motor drive data corresponding to the optimized sound signal as a setting motor drive data.

In order to achieve the above object, the present disclosure also provides a noise reduction module applied to the feeding apparatus. The feeding apparatus comprises a motor and a driving unit, and the driving unit drives the motor to run. The noise reduction module comprises an audio receiving unit and a control unit. The audio receiving unit receives the sound generated by the feeding apparatus as the motor is running. The control unit is electrically connected to the driving unit and the audio receiving unit. The control unit sequentially supplies a plurality of motor drive data to the driving unit to drive the motor to run. The control unit sequentially receives a plurality of sound signals corresponding to those motor drive data from the audio receiving unit. The control unit analyzes the sound signals and selects one of the sound signals as an optimized sound signal. The control unit stores the motor drive data corresponding to the optimized sound signal as a setting motor drive data.

In order to achieve the above object, the disclosure further provides a noise reduction method, which is applied to the feeding apparatus. The feeding apparatus comprises a motor, a driving unit, and a noise reduction module, and the driving unit drives the motor to run. The noise reduction module comprises an audio receiving unit and a control unit. The noise reduction method comprises the following steps: the control unit suppling a plurality of motor drive data to the driving unit to drive the motor to run; the audio receiving unit receiving the sound generated by the feeding apparatus as the motor is running, and sequentially generating a plurality of sound signals corresponding to those motor drive data respectively; the control unit sequentially receiving the sound signals from the audio receiving unit; the control unit analyzing the sound signals and selecting one of the sound signals as an optimized sound signal; and the control unit storing the motor drive data corresponding to the optimized sound signal as a setting motor drive data.

According to one embodiment of the present disclosure, the control unit analyzes the volume of the sound signals and selects one of the sound signals within the lowest volume as the optimized sound signal.

According to one embodiment of the present disclosure, the control unit analyzes the frequencies of the sound signals, and selects one of the sound signals whose frequency is within a comfortable frequency range to mark them as the optimized sound signal.

According to one embodiment of the present disclosure, these motor drive data respectively comprise a predetermined rotation speed and a predetermined mode, and the predetermined rotation speed or the predetermined mode of these motor driving data is different.

According to one embodiment of the present disclosure, after the control unit analyzes the sound signals and acquires a plurality of sound signal results, the control unit selects an optimized result from the sound signal results and marks the corresponding sound signal as the optimized sound signal.

As described above, according to the feeding apparatus, the noise reduction module and the noise reduction method of the present disclosure, as motor is running, the sound generated by the feeding apparatus is received by the audio receiving unit of the noise reduction module, and the control unit analyzes a plurality of sound signals corresponding to those motor drive data and selects one of them to mark as an optimized sound signal. In addition, the control unit stores the motor drive data corresponding to the optimized sound signal as a setting motor drive data, so that the drive unit can subsequently drive the motor with the setting motor drive data to achieve the effect of noise reduction.

BRIEF DESCRIPTION OF THE DRAWINGS

In the drawings, wherein similar reference numerals denote similar elements throughout the several views.

DETAILED DESCRIPTION OF THE PREFERRED EMBODIMENT

In order to make the structure and characteristics as well as the effectiveness of the present disclosure to be further understood and recognized, detailed description of the present disclosure is provided as follows along with embodiments and accompanying figures.

Figure 1:
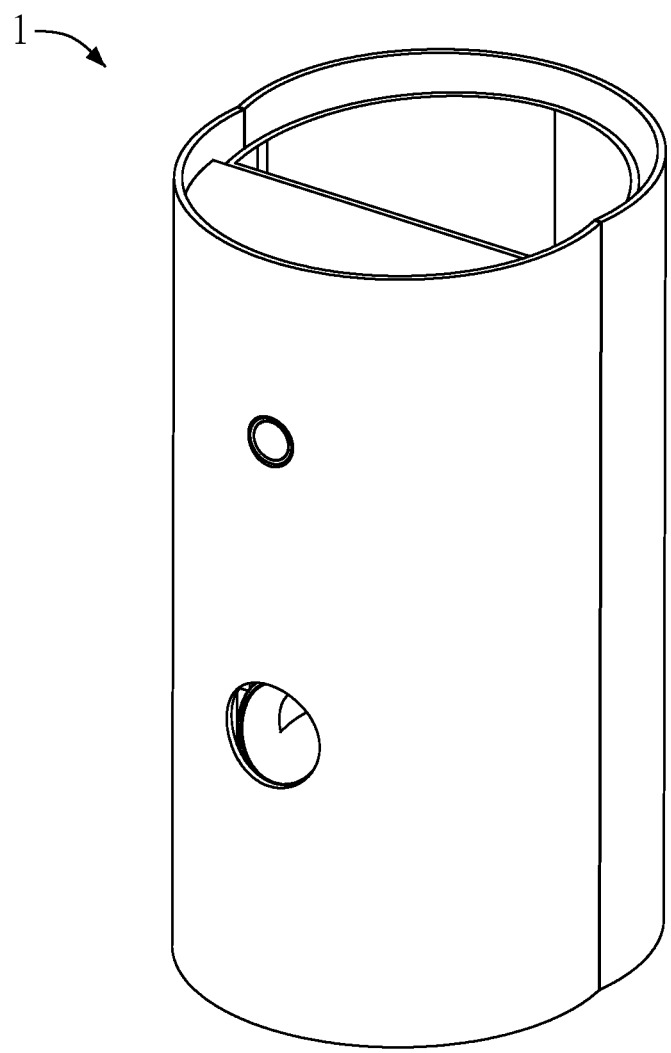
FIG. 1 is a schematic diagram of the feeding apparatus of an embodiment of the present disclosure.
Figure 2:
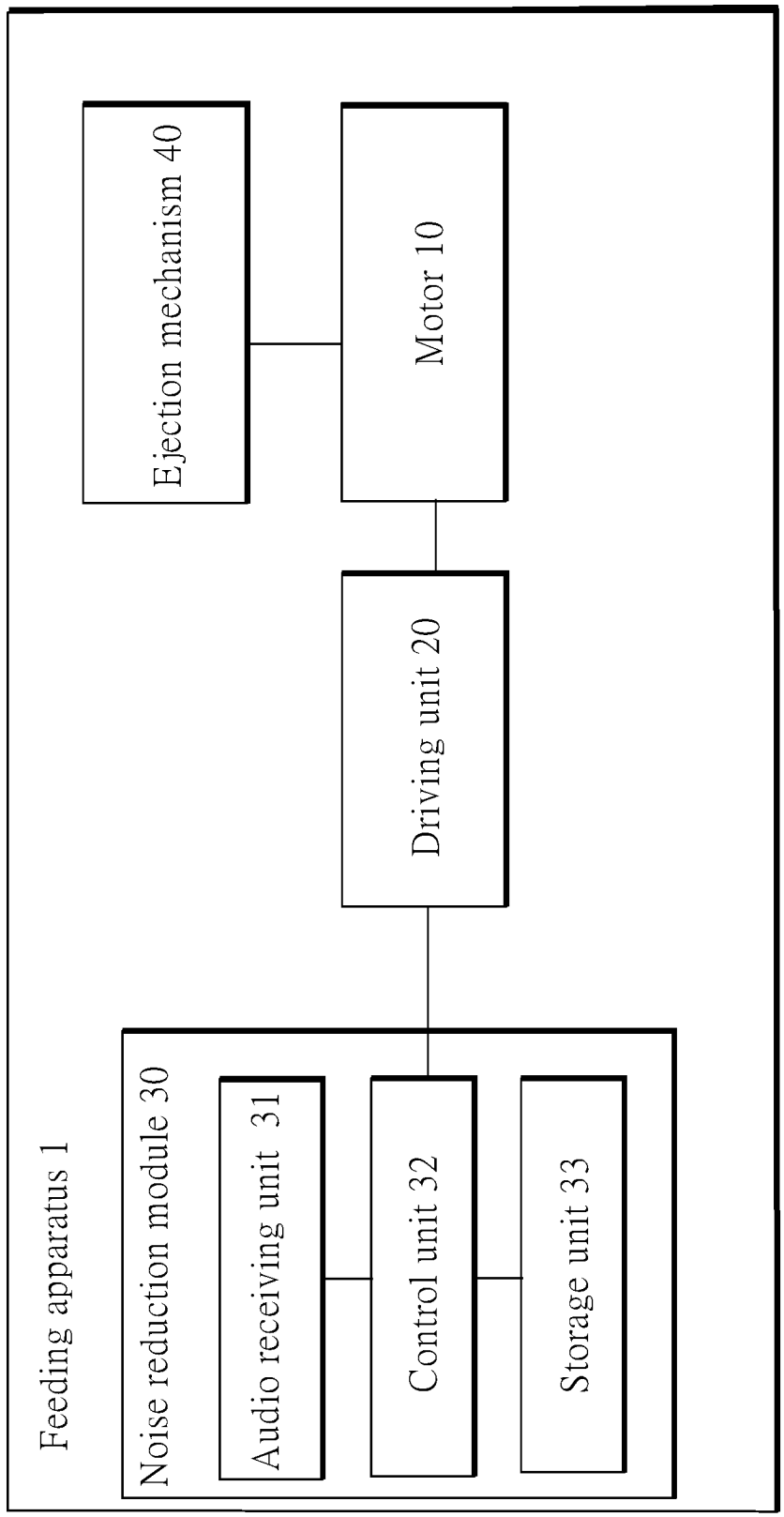
FIG. 2 is a block diagram of the feeding apparatus shown in FIG. 1.
Figure 3:
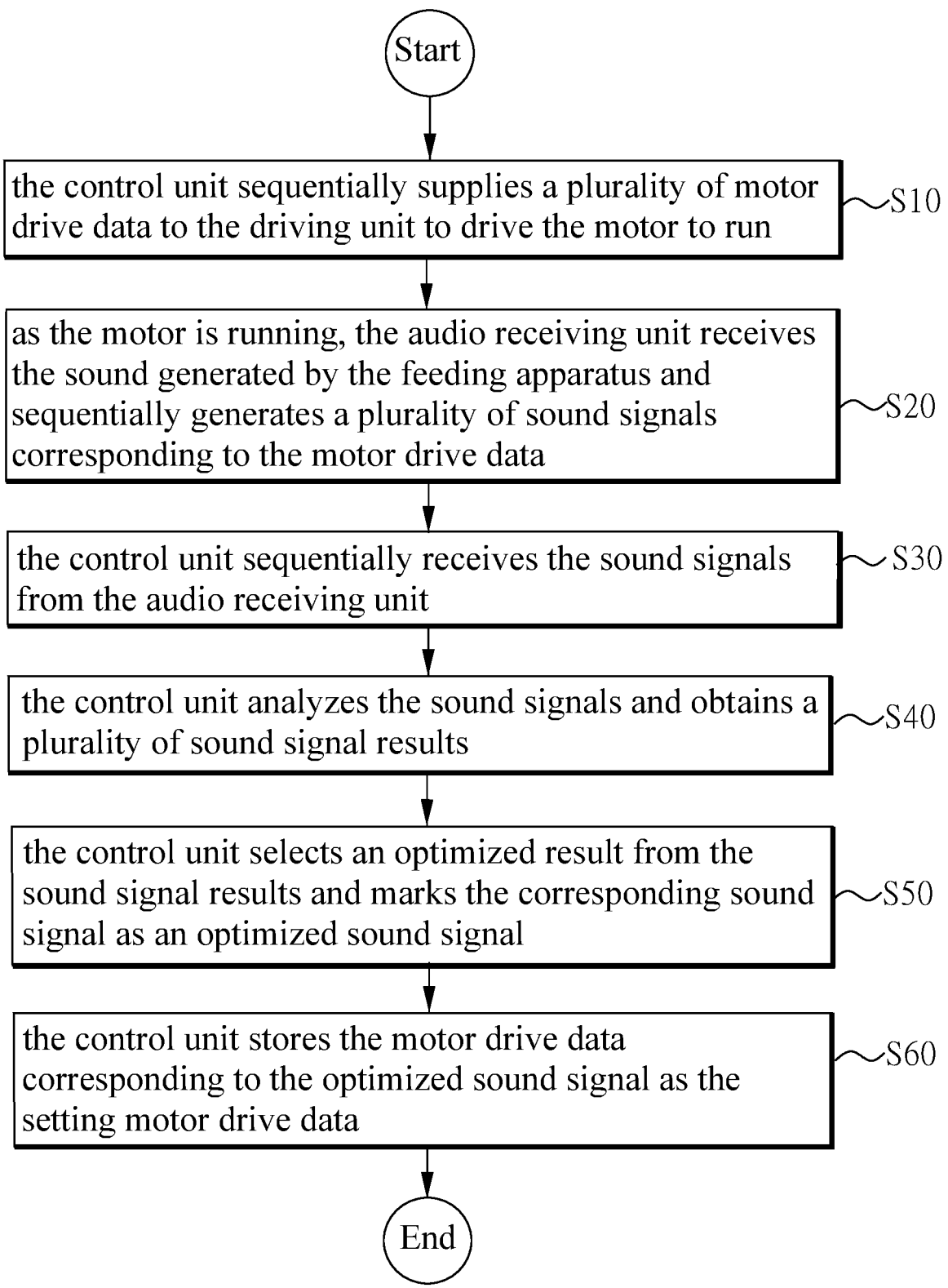
FIG. 3 is a schematic flow diagram of the noise reduction method of an embodiment of the present disclosure.

FIG. 1 is a schematic diagram of the feeding apparatus of an embodiment of the present disclosure, FIG. 2 is a block diagram of the feeding apparatus shown in FIG. 1, and FIG. 3 is a schematic flow diagram of the noise reduction method of an embodiment of the present disclosure. Please refer to FIG. 1, FIG. 2 and FIG. 3. First of all, the feeding apparatus 1 of the present embodiment is applied to an ejection type automatic feeding apparatus to throw the pet food to the pet to be fed, so as to achieve the effect of feeding and funny interaction with the pet at the same time. In this embodiment, pet foods or snacks are referred to as material. In other embodiments, the material can also be a toy for pets. The user (the pet keeper) can place the feeding apparatus 1 in a living room or a pet's game room, and can throw pet food regularly or control the throwing action of the feeding apparatus 1 in a remote control manner.

The feeding apparatus 1 of this embodiment comprises a motor 10, a driving unit 20, a noise reduction module 30, and an ejection mechanism 40, wherein the motor 10 is connected to the ejection mechanism 40 to provide a power for the ejection mechanism 40. The driving unit 20 is electrically connected to the motor 10, and can drive the motor 10 to run, thereby making the ejection mechanism 40 eject the material to the outside of the feeding apparatus 1. The motor 10 of the present embodiment takes a stepping motor as an example. There is noise as the motor 10 is running, and the operation of the ejection mechanism 40 may also cause the feeding apparatus 1 to generate resonance noise. In this embodiment, the noise reduction module 30 is provided to reduce noise interference. The noise reduction module 30 of this embodiment comprises an audio receiving unit 31 and a control unit 32. The control unit 32 is electrically connected to the driving unit 20 and the audio receiving unit 31 to perform data transmission with the driving unit 20 and the audio receiving unit 31.

It should be noted that the above noise reduction module 30 and each unit, in addition to being configured as a hardware device, software program, firmware or a combination thereof, can also be configured by circuit loops or other appropriate types. The connection between each unit is wired or wirelessly connected for data reception and transmission; each unit can be configured separately or in a combined manner. In addition, this embodiment only exemplifies a preferred embodiment of the present disclosure, and does not describe all possible variations and combinations in detail to avoid repetition. However, those skilled in the art should understand that not all of the above modules or units are necessary. In order to implement the disclosure, other more detailed conventional modules or units may also be included, and each module or unit may be omitted or modified as necessary.

In this embodiment, the noise reduction module 30 may also comprise a storage unit 33. The storage unit 33 stores a noise reduction method, which is executed by the noise reduction module 30 of the feeding apparatus 1. The action of the feeding apparatus 1 is further described in the following according to the steps of the noise reduction method.

Step S10: the control unit 32 sequentially supplies a plurality of motor drive data to the driving unit 20 to drive the motor 10 to run.

In this embodiment, the storage unit 33 can store a plurality of motor drive data, and the control unit 32 sequentially obtains the motor drive data from the storage unit 33 and transmits them to the driving unit 20. In other embodiments, the motor drive data can also be stored in the control unit 32 and, accordingly, transmits to the driving unit 20. This is not limited by the present disclosure. Specifically, the motor drive data includes a plurality of motor drive data from a $1^{st}$ motor drive data to an $n^{th}$ motor drive data, wherein each record of motor drive data may comprise a predetermined rotation speed and a predetermined mode, and the predetermined rotation speed or the predetermined mode of each record of motor driving data is different. The predetermined rotation speed is the rotation speed at which the ejection mechanism 40 can be actuated. Since the ejection mechanism 40 throws the material through a structure such as a push rod or an ejection rod, the ejection mechanism 40 can be driven at a low speed. In other words, the predetermined rotation speed may be a low rotation speed, such as but not limited to 5 rpm to 30 rpm. In some embodiments, the range of the predetermined rotation speed can also be adjusted according to different structural designs of the ejection mechanism 40, which is not limited by the present disclosure. In addition, the predetermined mode may be, for example, but not limited to, a full step mode or a micro step mode. The predetermined mode may also have other different modes according to the design of the motor 10, and the present disclosure is not limited to the full step mode and the micro step mode.

In addition, the number (n) of the motor drive data depends on the number of the predetermined rotation speeds and the predetermined modes to be tested. For example, if the test is performed every 5 rpm and both the full step mode and the micro step mode are tested, the number (n) of motor drive data is 12. Specifically, in this embodiment, the $1^{st}$ motor drive data can be 5 rpm, full step mode; the $2^{nd}$ motor drive data can be 10 rpm, full step mode; . . . ; the $7^{th}$ motor drive data can be 5 rpm, micro step mode; the $12^{th}$ motor drive data (i.e. the $n^{th}$ motor drive data) can be 30 rpm, micro step mode. Similarly, take the aforementioned motor drive data as an example for illustration. In other embodiments, the predetermined rotation speed may also be in other ranges, and may also be performed every 1 rpm (or other rotation speed). The present disclosure is not limited to these.

Next, the driving unit 20 drives the motor 10 to operate according to the received motor drive data. For example, if the drive unit 20 has received the $1^{st}$ motor drive data, the motor is driven to run at a speed of 5 rpm and in full step mode.

Step S20: as the motor 10 is running, the audio receiving unit 31 receives the sound generated by the feeding apparatus 1 and sequentially generates a plurality of sound signals corresponding to the motor drive data.

Generally, the feeding apparatus 1, which is able to interact with the pets, has a video recording device and a microphone, such that the pet keeper can observe the pet's activities from other places. The audio receiving unit 31 of this embodiment can be a microphone built in the feeding apparatus 1, or an additionally provided sound-receiving element, which is not limited by the present disclosure. The audio receiving unit 31 of this embodiment is used to receive the sound generated by the feeding apparatus 1 as the motor 10 is running. As mentioned previously, it includes the sound generated by the operation of the motor 10 and the sound generated by the operation of the ejection mechanism 40 of the feeding apparatus 1. Next, the audio receiving unit 31 generates a sound signal corresponding to the motor drive data for driving the motor 10 to run.

For example, when the driving unit 20 drives the motor 10 to run according to the $1^{st}$ motor drive data, the audio receiving unit 31 receives the current sound (including the sound of the motor 10 operation) generated by the feeding apparatus 1, and correspondingly generates a $1^{st}$ sound signal. In other words, the $1^s$ sound signal corresponds to the $1^{st}$ motor drive data. Next, when the driving unit 20 drives the motor 10 to run according to the $2^{nd}$ motor drive data, the audio receiving unit 31 receives the current sound generated by the feeding apparatus 1, and correspondingly generates a $2^{nd}$ sound signal. The $2^{nd}$ sound signal corresponds to the $2^{nd}$ motor drive data. By analogy, the sound signals sequentially generated by the audio receiving unit 31 include the $1^s$ sound signal to the $n^{th}$ sound signal.

Step S30: the control unit 32 sequentially receives the sound signals from the audio receiving unit 31.

The control unit 32 sequentially receives the aforementioned sound signals (from the $1^s$ sound signal to the $n^{th}$ sound signal) from the audio receiving unit 31, analyzes the sound signals, and selects the optimized sound signal (Step S40 and Step S50).

Step S40: the control unit 32 analyzes the sound signals and obtains a plurality of sound signal results.

The control unit 32 analyzes the audio signal and obtains the corresponding sound signal result. In this embodiment, the control unit 32 can analyze the volume and frequency, and the obtained sound signal result includes the volume and frequency corresponding to the sound signal. For example, the control unit 32 analyzes the $1^s$ sound signal to obtain the $1^s$ sound signal result, and the $1^s$ sound signal result includes the volume and frequency of the $1^s$ sound signal. Next, the control unit 32 analyzes the $2^{nd}$ sound signal to obtain the $2^{nd}$ sound signal result, and repeats the analysis step until the $n^{th}$ sound signal result is obtained.

Figure 4:
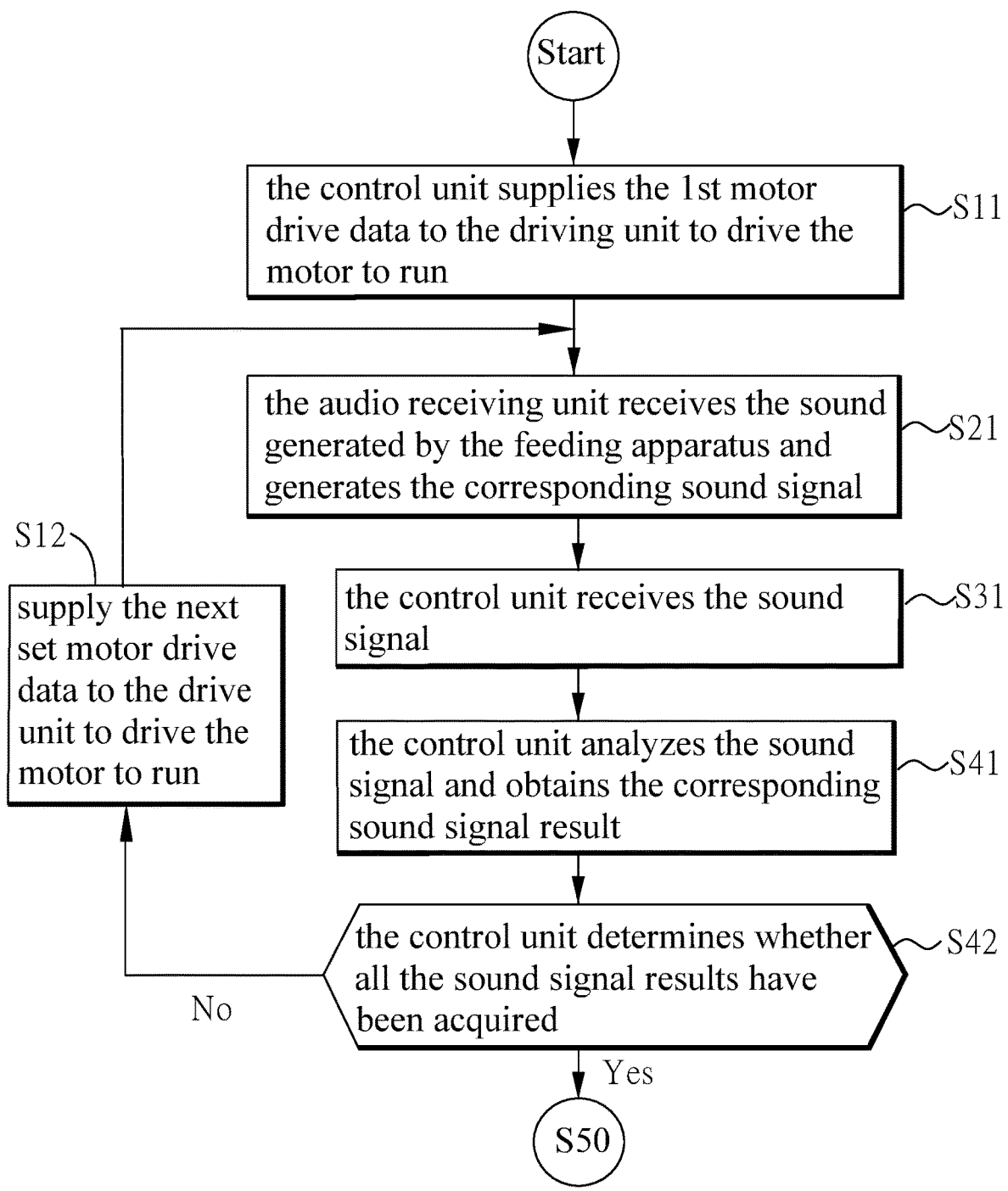
FIG. 4 is a schematic flow diagram of the implementation of Step S10 to Step S40 shown in FIG. 3.

In this embodiment, after the control unit 32 obtains all the sound signal results corresponding to the motor drive data, step S50 is then executed. The above-stated steps S10 to S40, that is, the plurality of motor drive data sequentially provided, the plurality of sound signals sequentially generated, those sound signals sequentially received, and the obtained plural sound signal results, can be implemented as shown in FIG. 4. FIG. 4 is a schematic flow diagram of the implementation of Step S10 to Step S40 shown in FIG. 3. Please refer to FIG. 4.

Specifically, the control unit 32 supplies the $1^{st}$ motor drive data to the driving unit 20 to drive the motor 10 to run (Step S11); the audio receiving unit 31 receives the sound generated by the feeding apparatus 1 and generates the corresponding ($1^{st}$) sound signal (Step S21); the control unit 32 receives the sound signal (Step S31); the control unit 32 analyzes the sound signal and obtains the corresponding ($1^{st}$) sound signal result (Step S41).

Then, the control unit 32 determines whether all (n sets) of sound signal results have been acquired (Step S42). If not, supply the next set of ($2^{nd}$) motor drive data to the drive unit 20 to drive the motor 10 to run (Step S12), and then repeat steps S21, S31, and S41 until the control unit 32 determines that all (n sets) sound signal results have been acquired. If the control unit 32 determines that all (n sets) sound signal results have been acquired, then go to Step S50. Please refer to FIG. 3.

In other embodiments, the judgment step may also be done in Step S31. That is, the control unit 32 receives the sound signals and determines whether all ($1^{st}$ to $n^{th}$) sound signals have been acquired. If not, the next set of ($2^{nd}$) motor drive data is likewise provided to the driving unit 20 until the control unit 32 determines that all the sound signals have been acquired, and after all the sound signals are obtained, Steps S40 to S60 are performed together.

Step S50: the control unit 32 selects an optimized result from the sound signal results and marks the corresponding sound signal as an optimized sound signal.

After obtaining all (n sets of) sound signal results, the control unit 32 can select an optimized result from the volume and/or frequency contained in the sound signal results. The optimized result may be the lowest volume and/or the frequency within a comfortable frequency range, preferably a frequency range suitable for common pets (e.g. cats, dogs). The order of judgment is not limited by the present embodiment. For example, the one with the lowest volume can be selected first, and if there are plural cases, the one within the comfortable frequency range is then selected. Alternatively, the one within the comfortable frequency range can be selected first, and if there are plural cases, the one with the lowest volume is then selected.

The control unit 32 selects an optimized result from all the sound signal results according to the volume and/or frequency, and marks the sound signal corresponding to the optimized result as an optimized sound signal. In other words, the control unit 32 analyzes the volume and/or frequency of all ($1^{st}$ to $n^{th}$) sound signals, and selects one of them (for example, the one with the lowest volume and/or the one within a comfortable frequency range) and marks it as an optimized sound signal. For example, if the sound signal result of the $10^{th}$ sound signal is the lowest volume and within the comfortable frequency range, then the $10^{th}$ sound signal is marked as the optimized sound signal.

Step S60: the control unit 32 stores the motor drive data corresponding to the optimized sound signal as the setting motor drive data.

After the control unit 32 stores the motor drive data corresponding to the optimized sound signal as the setting motor drive data, the driving unit 20 subsequently drives the motor 10 to run with the setting motor drive data to achieve the effect of noise reduction.

Following the above example, if the $2^{nd}$ sound signal is marked as an optimized sound signal, it means that when the driving unit 20 drives the motor 10 to run according to the $2^{nd}$ motor drive data (10 rpm, full step mode), the sound generated by the motor 10 and the whole feeding apparatus 1 has the lowest volume and the frequency suitable for the hearing of ordinary pets. Therefore, the control unit 32 can store the $2^{nd}$ motor drive data as the setting motor drive data, such that the drive unit 20 subsequently drives the motor 10 to run with the $2^{nd}$ motor drive data (setting motor drive data). Under this condition, the sound produced by the feeding apparatus 1 has the lowest volume or the frequency suitable for the hearing of ordinary pets, thereby achieving a noise reduction effect.

As described above, according to the feeding apparatus, the noise reduction module and the noise reduction method of the present disclosure, as motor is running, the sound generated by the feeding apparatus is received by the audio receiving unit of the noise reduction module, and the control unit analyzes a plurality of sound signals corresponding to those motor drive data and selects one of them to mark as an optimized sound signal. In addition, the control unit stores the motor drive data corresponding to the optimized sound signal as a setting motor drive data, so that the drive unit can subsequently drive the motor with the setting motor drive data to achieve the effect of noise reduction.

Although the disclosure has been explained in relation to its preferred embodiment, it is to be understood that many other possible modifications and variations can be made without departing from the spirit and scope of the disclosure as hereinafter claimed.

What is claimed is:

1. A feeding apparatus, comprising:
    a motor;
    a driving unit electrically connected to the motor and driving the motor to run; and
    a noise reduction module, comprising:
        an audio receiving unit receiving the sound generated by the feeding apparatus as the motor is running; and
        a control unit electrically connected to the driving unit and the audio receiving unit, wherein the control unit sequentially supplies a plurality of motor drive data to the driving unit to drive the motor to run; the control unit sequentially receives a plurality of sound signals corresponding to those motor drive data from the audio receiving unit; the control unit analyzes the sound signals and selects one of the sound signals as an optimized sound signal; and the motor drive data corresponding to the optimized sound signal is stored as a setting motor drive data.

2. The feeding apparatus as claimed in claim 1, wherein the control unit analyzes the volume of the sound signals and selects one of the sound signals within the lowest volume as the optimized sound signal.

3. The feeding apparatus as claimed in claim 1, wherein the control unit analyzes the frequencies of the sound signals, and selects one of the sound signals whose frequency is within a comfortable frequency range to mark them as the optimized sound signal.

4. The feeding apparatus as claimed in claim 1, wherein these motor drive data respectively comprise a predetermined rotation speed and a predetermined mode, and the predetermined rotation speed or the predetermined mode of these motor driving data is different.

5. The feeding apparatus as claimed in claim 1, wherein after the control unit analyzes the sound signals and acquires a plurality of sound signal results, the control unit selects an optimized result from the sound signal results and marks the corresponding sound signal as the optimized sound signal.

6. A noise reduction module applied to a feeding apparatus, the feeding apparatus comprising a motor and a driving unit, the driving unit driving the motor to run, the noise reduction module comprising:
    an audio receiving unit receiving the sound generated by the feeding apparatus as the motor is running; and
    a control unit electrically connected to the driving unit and the audio receiving unit, wherein the control unit sequentially supplies a plurality of motor drive data to the driving unit to drive the motor to run; the control unit sequentially receives a plurality of sound signals corresponding to those motor drive data from the audio receiving unit; the control unit analyzes the sound signals and selects one of the sound signals as an optimized sound signal; and the motor drive data corresponding to the optimized sound signal is stored as a setting motor drive data.

7. The noise reduction module as claimed in claim 6, wherein the control unit analyzes the volume of the sound signals and selects one of the sound signals within the lowest volume as the optimized sound signal.

8. The noise reduction module as claimed in claim 6, wherein the control unit analyzes the frequencies of the sound signals, and selects one of the sound signals whose frequency is within a comfortable frequency range to mark them as the optimized sound signal.

9. The noise reduction module as claimed in claim 6, wherein these motor drive data respectively comprise a predetermined rotation speed and a predetermined mode, and the predetermined rotation speed or the predetermined mode of these motor driving data is different.

10. The noise reduction module as claimed in claim 6, wherein after the control unit analyzes the sound signals and acquires a plurality of sound signal results, the control unit selects an optimized result from the sound signal results and marks the corresponding sound signal as the optimized sound signal.

11. A noise reduction method applied to a feeding apparatus, the feeding apparatus comprising a motor, a driving unit, and a noise reduction module; the driving unit driving the motor to run; the noise reduction module comprising an audio receiving unit and a control unit; the noise reduction method comprising the following steps:
    the control unit suppling a plurality of motor drive data to the driving unit to drive the motor to run;
    the audio receiving unit receiving the sound generated by the feeding apparatus as the motor is running, and sequentially generating a plurality of sound signals corresponding to those motor drive data respectively;
    the control unit sequentially receiving the sound signals from the audio receiving unit;
    the control unit analyzing the sound signals and selecting one of the sound signals as an optimized sound signal; and
    the control unit storing the motor drive data corresponding to the optimized sound signal as a setting motor drive data.

12. The noise reduction method as claimed in claim 11, wherein the control unit analyzes the volume of the sound signals and selects one of the sound signals within the lowest volume as the optimized sound signal.

13. The noise reduction method as claimed in claim 11, wherein the control unit analyzes the frequencies of the sound signals, and selects one of the sound signals whose frequency is within a comfortable frequency range to mark them as the optimized sound signal.

14. The noise reduction method as claimed in claim 11, wherein these motor drive data respectively comprise a predetermined rotation speed and a predetermined mode, and the predetermined rotation speed or the predetermined mode of these motor driving data is different.

15. The noise reduction method as claimed in claim 11, wherein after the control unit analyzes the sound signals and acquires a plurality of sound signal results, the control unit selects an optimized result from the sound signal results and marks the corresponding sound signal as the optimized sound signal.

* * * * *